RADIO GUIDING SYSTEM

Filed April 2, 1945

INVENTORS
EDMOND M. DELORAINE
GERARD J. LEHMANN
BY
Percy P. Lantzy
ATTORNEY

Jan. 30, 1951 E. M. DELORAINE ET AL 2,539,405

RADIO GUIDING SYSTEM

Filed April 2, 1945 4 Sheets-Sheet 2

INVENTORS
EDMOND M. DELORAINE
GERARD J. LEHMANN
BY Percy P. Lantzy
ATTORNEY

RADIO GUIDING SYSTEM

Filed April 2, 1945 4 Sheets-Sheet 3

INVENTORS
EDMOND M. DELORAINE
GERARD J. LEHMANN
BY Percy P. Lantzy
ATTORNEY

RADIO GUIDING SYSTEM

Filed April 2, 1945 4 Sheets-Sheet 4

INVENTORS
EDMOND M. DELORAINE
GERARD J. LEHMANN
BY Percy P. Lantzy
ATTORNEY

Patented Jan. 30, 1951 2,539,405

UNITED STATES PATENT OFFICE 2,539,405

RADIO GUIDING SYSTEM

Edmond M. Deloraine and Gerard J. Lehmann, New York, N. Y., assignors to Federal Telephone and Radio Corporation, New York, N. Y., a corporation of Delaware Application April 2, 1945, Serial No. 586,227

4 Claims. (Cl. 343—112)

This invention relates to new and useful improvements in radio guiding systems and particularly systems for guiding aircraft along a predetermined course to landing.

In a copending application, Ser. No. 526,151, filed March 13, 1944, now Patent No. 2,426,184 granted August 26, 1947, a radio guiding system is described in which the guiding or landing lights of an airport are reproduced as images on the fluorescent screen of the oscilloscope which simulate the visual impression that the pilot would gain when viewing the lights.

The object of the present invention is to enhance the naturalness of the impression conveyed to the pilot. This is accomplished by producing two images corresponding to each guiding light or transmitter, said images being spacially displaced with respect to one another to produce a stereoscopic effect.

According to one embodiment herein disclosed the plane is equipped with two antennas one on each side of the cockpit under the wings. These antennas will produce a sharp pattern which by mechanical or electrical means is caused to scan over a solid angle of sufficient opening. Each of the antennas controls a separate cathode ray oscillograph. The fluorescent screen of one oscillograph is viewed by the right and that of the other oscillograph by the left eye of the pilot. By slightly displacing with respect to one another the images of a transmitter produced on the screens of the two oscillographs the pilot gets a stereoscopic impression.

According to a second embodiment the two oscillographs are replaced by a single oscillograph. As in the previous case two antennas are provided which are caused successively to produce on the oscillograph screen a pair of images of each transmitter displaced so as to produce the desired stereoscopic effect.

These and other objects and features of the invention will more clearly appear from the following detailed description of the two embodiments above referred to and the appended claims.

Figure 1:
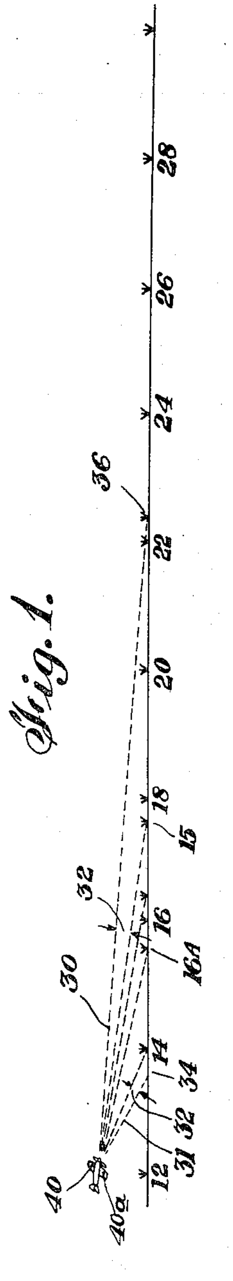
Fig. 1 is a diagram in elevation showing an aircraft approaching a landing using the system in accordance with our invention.
Figure 2:
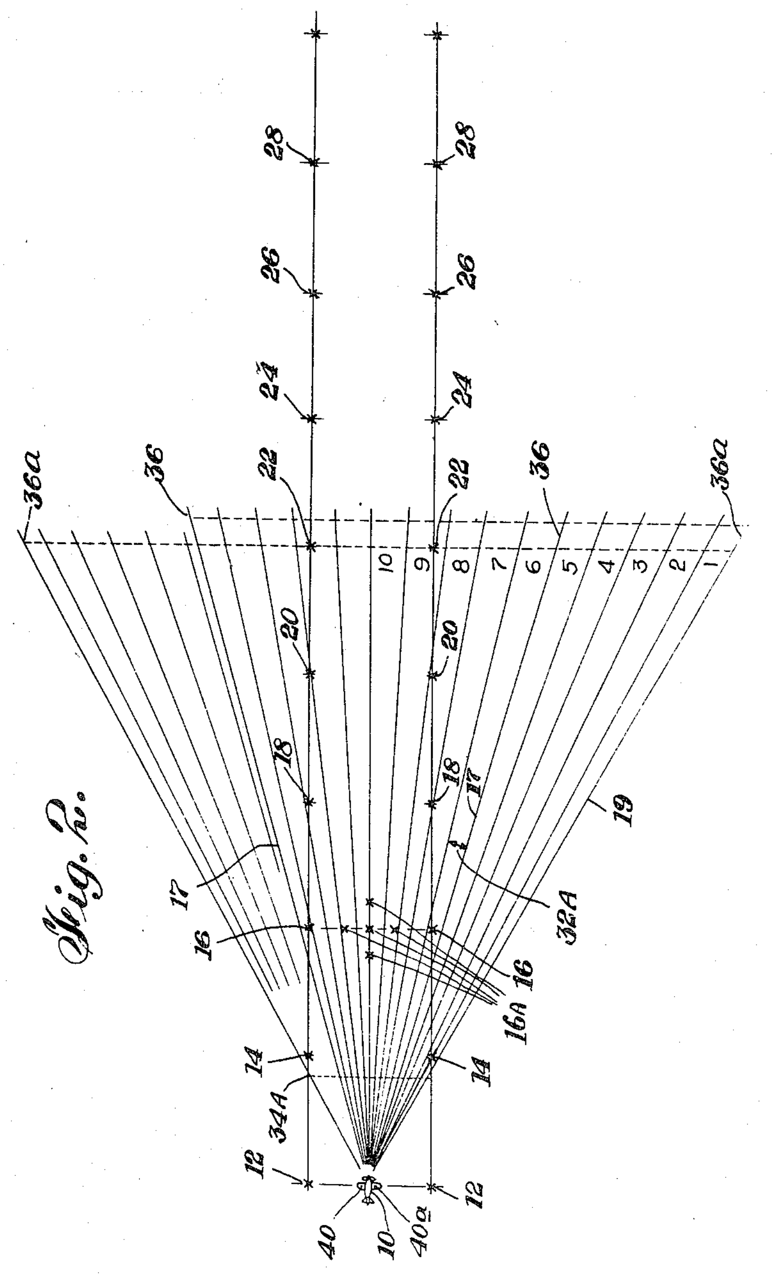
Fig. 2 is a diagram in plan view of the same aircraft and landing field arrangement shown in Fig. 1.

Turning to Figs. 1 and 2, an aircraft is indicated at 10 approaching a landing runway marked by radiators 12, 14, 16, 18, 20, 22, 24, 26 and 28. Each of these radiators may correspond to lights normally placed on opposite sides of the runway. Preferably, low power radio transmitting units are mounted on the same posts supporting the regular landing lights. At the beginning of the runway may be provided a special marker arrangement consisting of the five radiating units arranged as shown at 16A, Fig. 2. Craft 10 is approaching the runway along line 30 so that the point of contact of the craft with the runway will occur substantially at the point 36. In the diagram as the craft approaches the runway two sharply directive radiation receivers, such as beam type antennas, are caused to scan the field in advance of the craft. This movement may be made vertically between lines 30 and 31 and horizontally between other limits, such as indicated at 17—17 or 19—19, Fig. 2. Preferably, the system is working at very high radio frequencies. For example, the system may be working at a frequency such that a wavelength is between one and two centimeters in length.

The scanning beam, as indicated at 32, Fig. 1 and 32A, Fig. 2 may, for example, be such that the spread is at substantially three degrees. To accomplish this with an antenna and reflector, the opening of the parabolic reflector must be substantially 20 wavelengths. Thus, at one and one-half centimeters, the opening of the reflector would be 30 centimeters. As the reflector is scanned up and down in the vertical plane and back and forth in the horizontal plane, the beam serves to scan an area indicated generally between lines 34—34 and 36—36 of Fig. 2, assuming a 30° horizontal swing or the area defined by the lines 34A—34A, 36A—36A if the horizontal sweep is made to be 60°. With a three degree spread to the beam and a 30° horizontal scanning frame, there will be ten lines to a frame and with the 60° spread twenty lines, assuming no overlap on the beam, as indicated in Fig. 2. Of course, this will not provide an extremely well defined reproduction but will provide a fair approximation of the desired pattern.

As shown in Fig. 1, the beam, when it reaches its most nearly vertical swing, shown in this example as substantially 20 degrees from the horizontal, will spread in front of the craft a distance defined by 34—14, of Fig. 1. As the beam approaches more nearly a horizontal line this spreads until at the top of the swing it covers substantially a distance from 15 to point 36.

It should be understood, however, that this scanning beam is much stronger at the center line of the radiation pattern than it is at the edges. Accordingly, the energy received on the craft 10 from the portions of the beam when it is widely spaced, as shown at the upper extreme of the swing, will be lower in amplitude near the edges of this spread. By suitably choosing the constants of the receiving circuit, the system may operate so that only the radiating unit near the center of the beam, such as shown at 20, will produce sufficient signal energy to produce an indication on the craft. As the beam is swung in the horizontal field the spread does not alter but remains constant at three degrees as indicated at 32A of Fig. 2. It will thus be appreciated that as the beam is scanned over this area, the separate radiators 14, 16, 18, 20, 22 and 16A may be reproduced on an indicator on craft 10 in the manner of a television picture. Each of the radiators may be caused to appear as a spot of light on the screens of the two oscillographs. With the relatively wide scanning beam the spots of light on the oscillograph screens will generally be of the same width but slightly displaced with respect to one another producing a stereoscopic effect when the two are viewed together. When, however, the beam is such as to twice scan the same radiator in successive lines, the spots may appear on the screens as twice the normal width of the beam, and somewhat less brilliant.

Likewise, since the linear velocity of the scanning beam is greater, the further the swinging is from the craft, the radiators 22 at the remote portion of scanning field will appear much closer together on the indicating screen than will radiators 14 which are relatively close to the craft. Accordingly, the indicator will produce not only an individual stereoscopic but an overall perspective indication corresponding to the impression that would be made on the human eye when visually observing the landing lights.

The degree of definition of the indications will depend upon the number of scanning lines provided over the area, and the sharpness of the scanning beam.

Figures 3, 4:
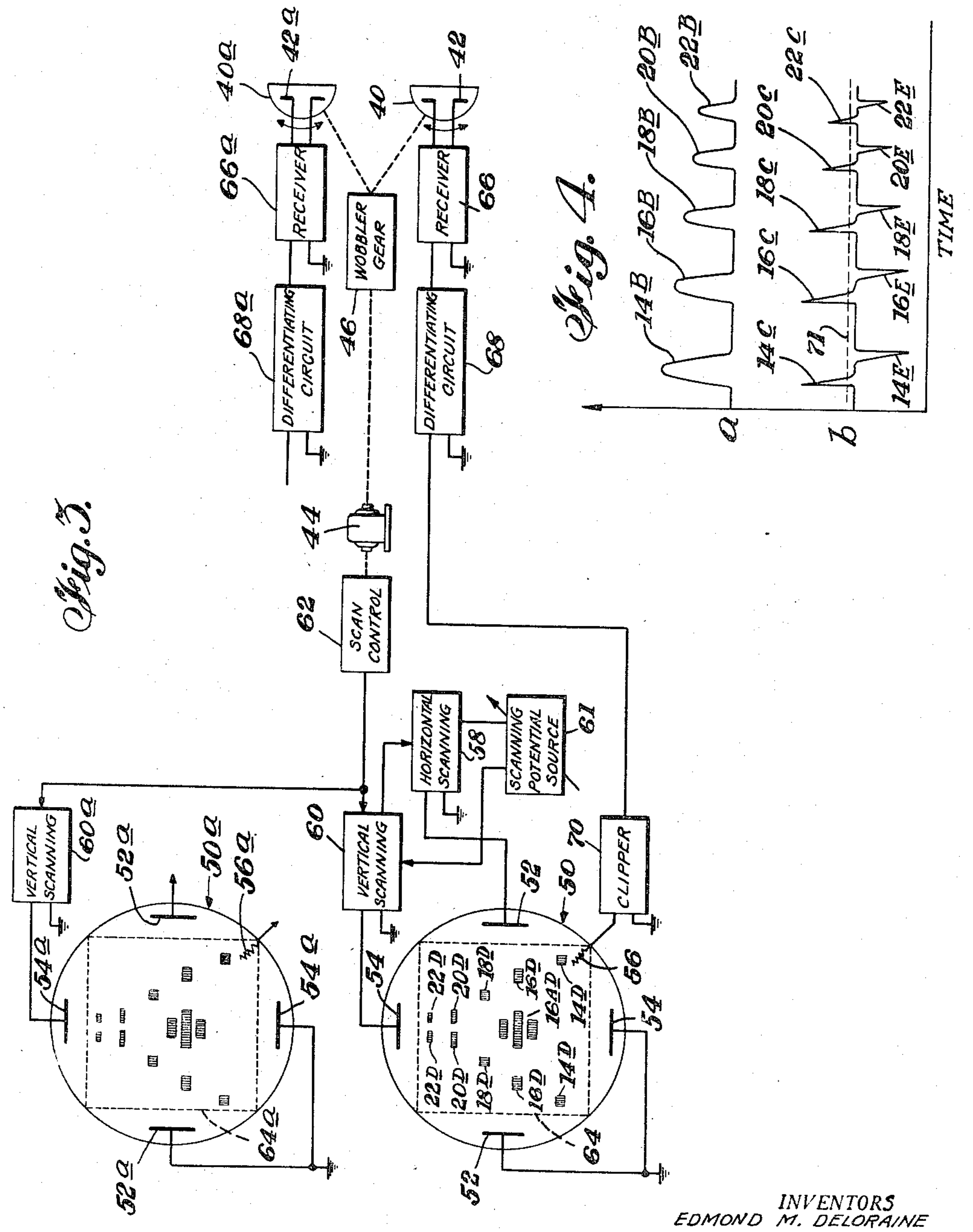
Fig. 3 is a circuit diagram partly in block of a receiver system in accordance with our invention.
Fig. 4 is a set of curves used in explaining the operation of the circuit in Fig. 3.

A circuit arrangement for the craft receivers is shown in Fig. 3. One of the receivers comprises a reflector 40 having mounted at the focus thereof an antenna 42. The second receiver has a similar reflector 40a and antenna 42a. The antenna structures may be mounted to the right and left of the cockpit under the wings. By means of a motor 44 and a wobbler gear mechanism 46, reflectors 40 and 40a are caused to oscillate in two directions, providing a scanning movement so that the directive antennas will be effective over a given area in front thereof. Also on the craft are provided two oscillographs 50 and 50a indicated as cathode ray oscillographs in Fig. 3 and provided with horizontal deflector plates 52, 52a and vertical deflector plates 54, 54a as well as control grids 56 and 56a which serve to control the intensity of the cathode ray beam. The two oscillographs are alike and some of their controlling means are shown only in connection with 50. The horizontal scanning waves may be produced in a horizontal scanning circuit 58 and the vertical scanning generator 60. A variable scanning potential source 61 is provided to control the angular sweep of the cathode ray beam of 50, as may be desired.

Both of the scanning generators of the two oscillographs are controlled by a scanning control mechanism 62 so that the beams of the cathode ray oscillographs will be scanning over the surface 64a in the same timed relation as the directive radiant acting pattern is scanned over the area on the surface of the earth to be simulated. As the directive action of the antenna assemblies 40, 42 and 40a, 42a is swept over the field containing the various radiators, there is produced in receivers 66 and 66a wave forms having impulses corresponding to the passage of the reception beam of antennas 42 and 42a over the separate radiators. Thus, the separate radiators 14, 16, 18, 20 and 22 will produce in 42 pulses of energy, for example, as shown in curve *a* of Fig. 4 at 14B, 16B, 18B, 20B and 22B. These pulses may be applied to control grid 56 as the beam of the cathode ray oscillograph 50 is scanned over the surface causing the beam to produce bright spots on the screen corresponding to the time position of the pulses. These spots will be of a width dependent upon the scanning beam width and will vary in length and brightness dependent upon the distance of the radiators from the receiver. Thus, the radiating units 14, 16, 18, 20, 22 and 16 produce on the surface of the screen 64 the bright patterns shown at 14D, 16D, 18D, 20D, 22D, and 16D. This pattern simulates the direct visual view of the visible light sources arranged at the corresponding points along the landing runway. A corresponding pattern of bright spots is produced on screen 64a under the control of receiver 66a. Owing to the spacing between the two antennas 42 and 42a the corresponding spots on the two screens will be displaced so that when viewed together they will produce a stereoscopic effect.

The sharply directive beam still has considerable spread as can be readily appreciated from the form of pulses 14B—22B, Fig. 4. This spread may be greatly reduced and the beam may be effectively sharpened by using, for example, the leading edge of the beam to shorten the light spots on the screen and increase the visual separation. This may be accomplished by applying the output of receivers 66 and 66a to differentiating circuits 68 and 68a. In the output of the differentiating circuits will then be produced pulses such as shown in curve *b*, Fig. 4. At the point where curve *a* of Fig. 4 changes so that pulses 14B, 16B, etc., start to rise there is a maximum rate of change, thus producing in the output of the differentiating circuit a series of pulses 14C, 16C, 18C, 20C, and 22C. Similarly at the point where pulses 14B, etc., terminate is a second maximum rate of change producing a series of pulses 14E, 16E, 18E, 20E and 22E of opposite polarity to pulses 14C, 16C, etc.

Each of these pulses is quite sharp but they are progressively lower in amplitude due to the attenuation of the radio signals. These pulses may be clipped at a clipping level indicated at 71 in clipper 70 before application to control grid 56. It is clear that, if desired, the differentiated pulses 14E, etc., may be selected by clipping instead of the pulses 14C, etc. With this circuit the scanning beam is effectively shaped so that the spots reproduced on the screens will be more sharply defined. As in other picture reproducing systems the definition of the image produced will depend in part on the scanning frequency. Preferably, since the vertical scanning angle is smaller than the horizontal scanning angle, the beam will be scanned up and down in the screen at a relatively rapid rate and progressively scanned across the screen in the horizontal at a rate corresponding to the framing frequency of the picture.

Figure 5:
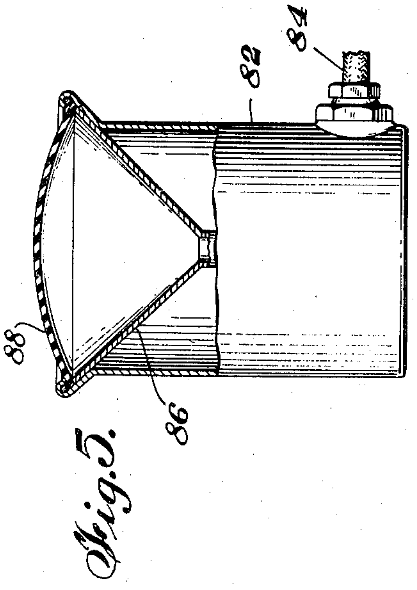
Fig. 5 is an elevational partly in section of a transmitter unit which may be used in the system of our invention.

In order that the radiators may simulate the light of the runway and at the marker points each of the radiators may, for example, take the form shown in Fig. 5. In accordance with this arrangement, the transmitting unit is housed within the housing 82 and supplied with power over a line 84. A radiating horn 86 may be provided and covered with a dielectric cover 88 which serves to prevent dust and moisture from entering the housing and adversely affecting the operation of the transmitter. It is clear that other forms of transmitters may be used, as desired, and that the radiator may be caused to produce any desired pattern. Preferably, the radiator should be so designed as to produce a radiation pattern substantially the same in shape as the visible light radiation pattern produced by the light sources mounted on the same towers.

Figure 6:
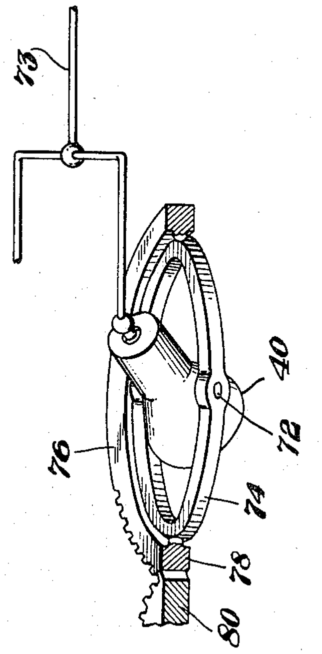
Fig. 6 is an illustration in perspective with parts in section of a scanning mechanism for moving the receiving antennas shown in Fig. 2.

For the purpose of scanning, each receiving antenna may be of a structure similar to that shown in Fig. 6. In this arrangement, the reflector 40 is caused to vary in the vertical plane by means of a crank arm 73. Crank arm 73 driven by a suitable mechanism, not shown, causing reflectors 40 and 40a to rock back and forth each being mounted in pinions 72 in a ring 74. Ring 74 is fastened by means of pins 78 to a partial ring gear 76. This ring gear 76 is meshed with a driving gear 80 so as to oscillate ring 74 and reflector 40 back and forth in a horizontal plane. Thus, the two motions necessary for scanning the beam over a given area are provided.

Figure 7:
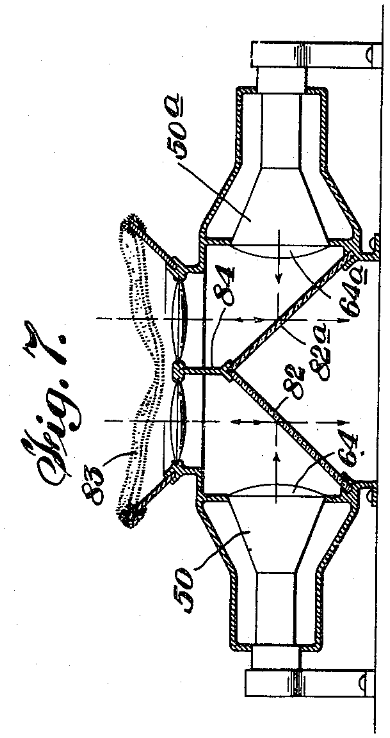
Fig. 7 is a diagrammatic illustration of a mounting structure for the system of Fig. 3 which the pilot of a plane may conveniently employ.

As shown in Fig. 7, the screen ends of the cathode ray tubes 50 and 50a project within a casing 81 where the images appearing on the screens 64 and 64a are reflected by means of semi-transparent screens 82 and 82a to the right and left eyes, respectively of the pilot. The forehead and nose of the pilot rest against a suitably shaped cushion 83 and the fields of vision of the eyes are separated by baffle 84.

The pilot may observe the indicator readings and still have direct visual observation of the landing field, owing to the provision of the semi-transparent screens 82, 82a. These may, for example, be half-silvered mirrors, or projection screens, so that a direct observation of objects may be made through the mirrors. This will cut down the light by about 50% but will still permit sufficient visibility to see the lights at the landing field and the adjacent terrain at times of normal visibility. The image projected on to the screens from the oscillographs will be superimposed on the visual pattern obtained by direct observation. As a consequence, the pilot may be able to fly his plane into a landing by direct visibility when conditions permit. At the same time, the instrument indications are always in front of him.

If it is desired slightly to adjust the swing of the cathode ray beams to bring the indications into proper relation, then the controls of scanning potential source 61 may be adjusted to produce the desired sweep of the beam in oscillograph 50. A similar control may be provided for 50a.

Figure 8:
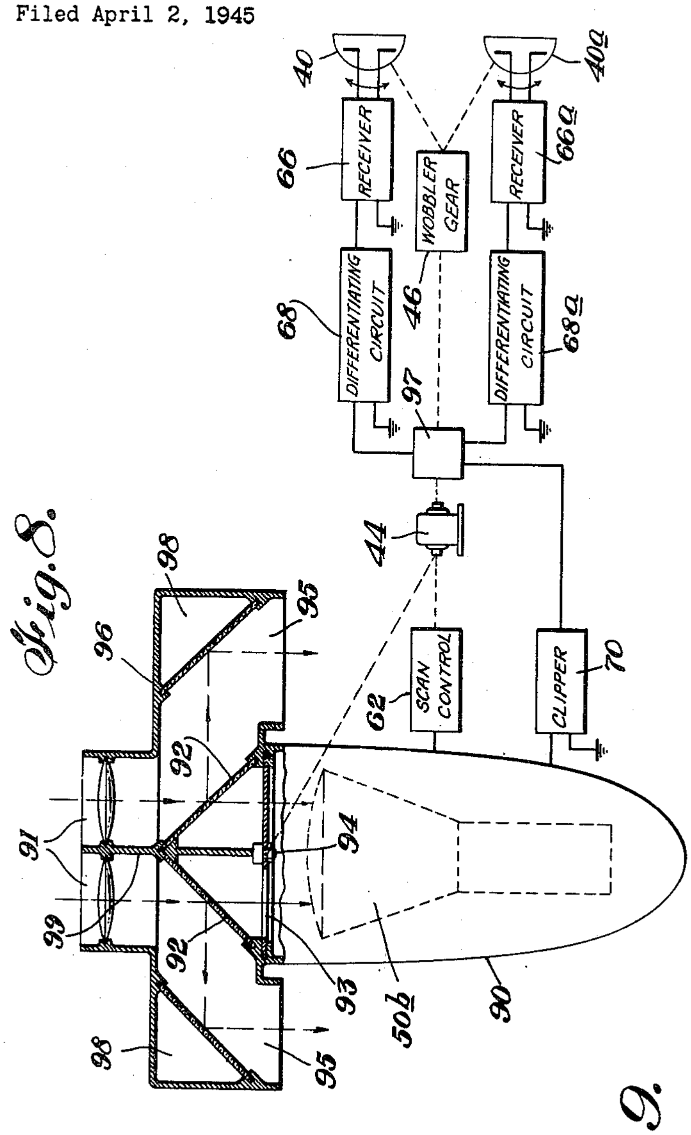
Fig. 8 is a diagrammatic view of a second embodiment of the invention illustrated in Figs. 2–7.
Figure 9:
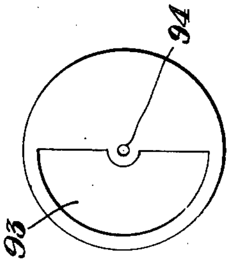
Fig. 9 is a plan view of a shutter employed in the viewer of Fig. 8.

Fig. 8 illustrates a system in which the two oscillographs of Fig. 3 are replaced by a single oscillograph 50b. The two antenna structures 40 and 40a of Fig. 1 are retained as are the receivers 66 and 66a, the differentiating circuits 68 and 68a, the scan control 62, motor 44 and wobbler gear 46 by means of which the two antennas are caused to scan the ground transmitters. The oscillograph 50b is otherwise just like the oscillograph 50 and there will be produced on its fluorescent screen dots caused alternately by the receivers 66 and 66a said dots being displaced with respect to one another just as were the dots of oscillographs 50 and 50a to produce a stereoscopic effect.

As indicated in the drawing the oscillograph 50b is suitably mounted within a housing 90 in such a position that its fluorescent screen can be viewed through eye pieces 91 and semi-transparent films 92. A shutter 93 is positioned between the eye pieces 91 and the screen of 50b in a housing 96. The shutter is rotated by the motor 44 about an axis 94 at such a rate that it will obstruct one eye piece when one differentiating circuit 68 and the other eye piece when the other differentiating circuit 68a is switched in by means 97 under the control of motor 44. The pilot looking through eye pieces 91 will therefore see alternately through one eye or the other the dots appearing on the screen of 50b and obtain the said stereoscopic impression as described in connection with the first embodiment.

Direct view of the landing lights can be obtained through openings 95 in housing 96 which encloses the semi-reflecting films 92 and on which the eye pieces 91, the shutter 93 and the housing 90 are mounted. The inside of the housing is divided into two compartments by baffle 99. Light through openings 95 is reflected by prisms 98 and the films 92 to the eye pieces 91.

Obviously many other modifications and embodiments herein disclosed may be practiced without departing from the spirit of the present invention as defined in the claims.

We claim:

1. An aircraft guiding system comprising a plurality of radio transmitters on the ground, two spaced receivers on the aircraft for receiving energy from said transmitters, two oscillographs on the aircraft each operated by the energy received by a different receiver for producing visual images for each transmitter, and stereoscopic means for simultaneously viewing the images on the two oscillographs comprising two eye pieces through which the two oscillographs are separately viewed, and means for affording direct view of the ground through said eye pieces.

2. In a radio guiding system for guiding an aircraft over an area provided with radio transmitters, comprising two directive antenna means mounted on said aircraft spaced from one another, means for alternately scanning the directive pattern of each antenna means over a predetermined portion of said area with respect to said aircraft to receive radio energy from transmitters located in said predetermined area, receiver means coupled to both antenna means for receiving energy picked up during the scanning operation to produce output waves having energy, pulses of energy corresponding to the energy picked up, differentiating means for differentiating said pulses to produce narrow pulses corresponding to the energy pulses and producing an effective narrowing of the receiver scanning beam, an oscillograph indicator, means for scanning the beam of the oscillograph indicator in timed relation over a surface on the screen of said indicator corresponding to said predetermined area scanned by the directive antenna means, and means for alternately applying the narrow pulses generated by energy from the two antenna means to a control electrode in said oscillograph to produce stereoscopic indications on the screen thereof corresponding in position to the position of the radiating means in said area.

3. A combination in accordance with claim 2, further comprising means for combining a reproduction of the indications on said screen with a visual view of the area being scanned in superposed relation.

4. A system for guiding an aircraft with respect to a course identified with spaced markers comprising means on said aircraft for producing a stereoscopic guiding indication of said markers with respect to said course, two spaced semi-transparent viewing screens arranged so that the pilot can view the course in front thereof through said screens and means for reproducing said guiding indication on the viewing surfaces of said screens whereby the pilot may observe both the guiding indication and the ground relative to the craft.

EDMOND M. DELORAINE.
GERARD J. LEHMANN.

REFERENCES CITED

The following references are of record in the file of this patent:

UNITED STATES PATENTS

| Number | Name | Date |
|---|---|---|
| 2,151,549 | Becker | Mar. 21, 1939 |
| 2,226,860 | Grieg | Dec. 31, 1940 |
| 2,279,246 | Podliasky et al. | Apr. 7, 1942 |
| 2,284,812 | Gage | June 2, 1942 |
| 2,408,050 | De Rosa | Sept. 24, 1946 |
| 2,426,979 | Ayres | Sept. 9, 1947 |